(12) United States Patent
Bashir

(10) Patent No.: US 11,910,208 B2
(45) Date of Patent: Feb. 20, 2024

(54) MITIGATING SIGNAL INTERFERENCE FOR INCUMBENT COMMUNICATIONS STATIONS IN A TELECOMMUNICATIONS OPERATING BAND

(71) Applicant: T-Mobile USA, Inc., Bellevue, WA (US)

(72) Inventor: Shahzad Bashir, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 218 days.

(21) Appl. No.: 17/192,537

(22) Filed: Mar. 4, 2021

(65) Prior Publication Data

US 2022/0286878 A1 Sep. 8, 2022

(51) Int. Cl.
*H04W 24/06* (2009.01)
*H04W 28/02* (2009.01)

(52) U.S. Cl.
CPC ....... *H04W 24/06* (2013.01); *H04W 28/0236* (2013.01)

(58) Field of Classification Search
CPC . H04W 24/06; H04W 28/0236; H04W 24/02; H04W 24/08
See application file for complete search history.

(56) References Cited

U.S. PATENT DOCUMENTS

| | | | | |
|---|---|---|---|---|
| 11,026,071 | B1* | 6/2021 | Files | H04W 4/40 |
| 2020/0295817 | A1* | 9/2020 | Loghin | H04B 7/0874 |
| 2021/0136600 | A1* | 5/2021 | Le | H04B 17/318 |
| 2022/0394736 | A1* | 12/2022 | Challita | G06N 3/08 |

* cited by examiner

*Primary Examiner* — Mazda Sabouri
(74) *Attorney, Agent, or Firm* — Lee & Hayes P.C.

(57) ABSTRACT

Systems and methods for avoiding radio frequency (RF) interference are discussed herein. To protect incumbent stations of a communications network, a wireless carrier can direct signals transmitted by network sites away from the proximal incumbent sites or can prevent transmitting signals from the network sites in the direction(s) of the proximal incumbent sites. The disclosed systems and methods can prevent interference by not transmitting the network signal in a direction of a proximal incumbent site without any prior information about the incumbent stations relative to proximal network sites (e.g., location, height, or the like). The disclosed systems and methods can transmit test signals, receive confirmation signals, and analyze confirmation signals to determine the direction(s) in which to not transmit network signals.

15 Claims, 3 Drawing Sheets

MITIGATING SIGNAL INTERFERENCE FOR INCUMBENT COMMUNICATIONS STATIONS IN A TELECOMMUNICATIONS OPERATING BAND

BACKGROUND

Telecommunications providers are expanding their services to operate in frequency bands in which other electronic communications systems and operators used to operate exclusively. For example, the United States Federal Communications Commission (FCC) recently authorized access to the C band (e.g., frequency band at 3.7 to 4.2 Gigahertz (GHz)) to telecommunications providers. Previously, the C band was occupied by receiving satellite stations or more generally "incumbent" stations. In the C band example, the incumbent stations receive signals. Some other example bands have their associated incumbent stations both receiving and transmitting signals. Further, the FCC has mandated that telecommunications networks transmitting in the transferred frequency bands must not interfere with the ability of these incumbent stations to receive or transmit signals, whichever the case may be, from other components with which the stations communicate (e.g., satellites). Such interference can prevent the incumbent stations from receiving a signal altogether or can affect the quality of the network signal received.

Currently, there are more than 400,000 network sites for telecommunications networks in the United States (with more being built) and approximately 17,000 incumbent stations operating across different frequency bands. Conventional systems and methods to protect incumbent stations from this inevitable expanding telecommunications equipment interference require the telecommunications provider to control all network sites proximal to the incumbent station. This means that the telecommunications providers need to know network site characteristics of the incumbent station relative to the proximal network sites (e.g., location, height, or the like). The network site characteristics can be obtained by a human physically visiting the network site or by data already known by the telecommunications provider. The telecommunications providers mitigate interference to the incumbent stations by determining a direction in which to avoid signal transmission from the network site, which they conventionally calculate based on the network site characteristics and incumbent site characteristics. The incumbent site characteristics are observed or tested by humans physically visiting each incumbent station site.

The conventional process incorporates the network site characteristics and the incumbent site characteristics into one or more equations or algorithms to determine one or more directions in which to avoid transmitting a signal from the network site. The network site is then instructed not to transmit a signal in that direction or, alternatively, the network site is then instructed to transmit signals in every direction except the direction of the incumbent station. The conventional process can be inaccurate due to unknown information of the network site relative to the incumbent station (e.g., location, height, or the like). Since there can be hundreds of network sites proximal to an incumbent site and multiple incumbent stations in a given area, these inaccuracies can cause compounded interference (i.e., if the network site transmission is directed to an improper location after the calculation) or may not reduce interference (i.e., if the network site transmits in a direction towards the incumbent station).

The state of the art would benefit from an improved and more efficient system that reduces interference within a telecommunications operating band.

DETAILED DESCRIPTION

Figure 1:
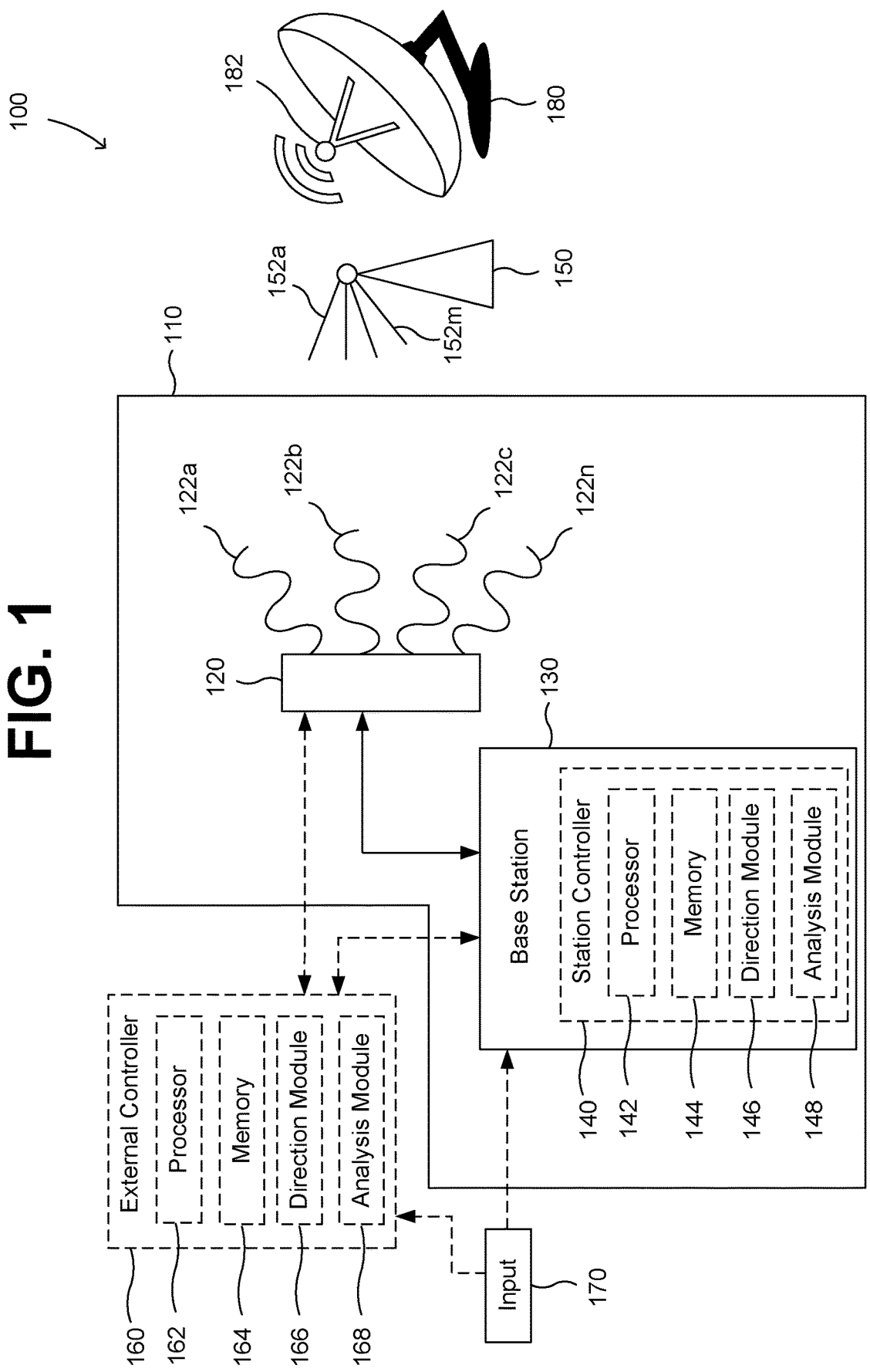
FIG. 1 illustrates an example system.

Systems and methods for avoiding radio frequency (RF) interference are discussed herein. A wireless carrier has a network of sites that transmit wireless communications between sites and user equipment (e.g., smartphone, mobile phone, laptop, personal digital assistant, tablet, or the like) and other computer networks. The network sites are physically separated, which form "cells" throughout a geographic region. That geographic region or cell can include incumbent stations. According to FCC regulations, the transmissions of the wireless carrier sites between cells or between sites and user equipment cannot interfere with the communications of the incumbent station. It is critical to avoid, eliminate, or reduce signal interference since interference of the incumbent station can inhibit data or signal transmission, reduce throughput, cause performance degradation, or the like. For example, satellites transmit signals to the incumbent stations. These signals can include data, instructions, or the like. Interfering with reception of these signals can prevent data (e.g., information collected or observed by a satellite) or instructions (e.g., whether to redirect an antenna or output an alert or communication to an operator) to be received and processed.

Conventional systems and methods to protect incumbent stations from expanding telecommunications equipment interference require the telecommunications provider to control all network sites proximal to the incumbent station. Therefore, the telecommunications providers need to know network site characteristics of the incumbent station relative to the proximal network sites (e.g., location, height, or the like). The network site characteristics can be obtained by a human physically visiting the network site or by data already known by the telecommunications provider. The telecommunications providers mitigate interference to the incumbent stations by determining a direction in which to avoid signal transmission from the network site, which they conventionally calculate based on the network site characteristics and incumbent site characteristics. The incumbent site characteristics are observed or tested by humans physically visiting each incumbent station site, which can be an inaccurate and time-consuming process.

The conventional process incorporates the network site characteristics and the incumbent site characteristics into one or more equations or algorithms to determine one or more directions in which to avoid transmitting a signal from the network site. The network site is then instructed not to transmit a signal in that direction or, alternatively, the network site is then instructed to transmit, or is otherwise not prohibited from transmitting, signals in every direction except the direction of the incumbent station. The conventional process can be inaccurate due to unknown information of the network site relative to the incumbent station (e.g., location, height, or the like). Since there can be hundreds of network sites proximal to an incumbent site and multiple incumbent stations in a given area, these inaccuracies can cause compounded interference (i.e., if the network site transmission is directed to an improper location after the calculation) or may not reduce interference at all (i.e., if the network site transmits in a direction towards the incumbent station).

A wireless carrier can adjust the operating frequencies of already-existing network sites, such as by frequency modulation, or build new network sites operating at a desired frequency or within a desired frequency spectrum. For example, the wireless carrier can own or obtain an exclusive license to a specific band of a frequency spectrum over which their wireless services are offered. This exclusive license can be procured from a previous owner or licensee, such as through an auction. The previous owner, having used this specific band, controls incumbent stations proximal to network sites controlled by the wireless carrier. The wireless carrier may need to switch operating frequencies upon acquisition of the license or new frequency.

An incumbent station is a communication station on Earth that communicates with a satellite orbiting Earth. These incumbent stations continue to receive signals in the specific band (e.g., the C band) acquired by the wireless carrier. These incumbent stations can also receive signals having a frequency that is proximal to or that overlaps with the specific band that was acquired. The incumbent stations and the network sites can co-exist (i.e., incumbent stations remain operational) by having the incumbent stations communicate in a first sub-band of the specific band and having the network sites communicate in a second sub-band of the specific band.

To protect the incumbent stations (as mandated by the FCC), the wireless carrier can direct signals transmitted by the network sites away from the proximal incumbent sites or can prevent transmitting signals from the network sites in the direction(s) of the proximal incumbent sites. Directing signals of the network sites away from the incumbent stations protects signal reception of the incumbent stations by avoiding signal interference caused by the network sites. The disclosed systems and methods can prevent interference by not transmitting the network signal in a direction of a proximal incumbent site. The disclosed systems and methods, unlike the conventional systems and methods, can prevent the interference without any information about the incumbent stations relative to proximal network sites (e.g., location, height, or the like).

For example, a wireless carrier owns a spectrum within a C band, which is a frequency band at 3.7 to 3.98 Gigahertz (GHz). This frequency band can be used for New Radio (NR or 5G). However, this frequency band was previously used for satellite communications (e.g., satellite television networks or raw satellite feeds). The incumbent stations can receive signals from proximal network sites, which cause interference. Signal reception by incumbent stations of the satellite communications networks can be interfered with by signals transmitted from network sites in the 3.7 to 3.98 GHz range. The incumbent stations can be protected by not transmitting the network signal in a direction of the incumbent site.

Furthermore, to deploy 5G, for example, wireless carriers need access to the C band. 5G is a fifth generation (hence. 5G) of wireless technology with each generation generally defined by transmission speeds greater than the preceding generation. Presently, 5G needs to be on a frequency below about 6 GHz to obtain the necessary physical distance range from network sites, such as within or across cities. Studies have shown that 3.5 GHz can reach 1.2 miles in cities and 6.2 miles in rural areas. Therefore, the FCC has worked with incumbent station operators to vacate a portion of C band for wireless carriers to be able to implement 5G.

The disclosed systems and methods can transmit test signals and receive and analyze confirmation signals to determine the direction(s) in which to avoid transmitting network signals. Test signals are signals output by an antenna to test possible interference in one or more directions. Confirmation signals are signals output by a transceiver in response to received test signals.

The system includes the antenna, the transceiver, and a controller. The antenna is an apparatus from which the signal can be transmitted or with which the signal can be received. The transceiver can receive test signals from the antenna and output confirmation signals to the antenna in response to the received test signals. The controller includes memory and a processor. The controller can collect and analyze signal data (i.e., data associated with test signals sent and confirmation signals received by the antenna). The controller can also determine a direction in which an incumbent station is located based on the signal data and instruct the antenna not to avoid transmitting a network signal in that direction. The controller can be in a base station or external to a network site.

It is critical to avoid, eliminate, or reduce signal interference since interference of the incumbent station can inhibit data or signal transmission, reduce throughput, cause performance degradation, or the like. For example, satellites transmit signals to the incumbent stations. These signals can include data, instructions, or the like. Interfering with reception of these signals can prevent data (e.g., information collected or observed by a satellite) or instructions (e.g., whether to redirect an antenna or output an alert or communication to an operator) to be received and processed.

FIG. 1 shows a system 100 to detect a direction in which to avoid transmitting a signal. The system 100 also transmits signals in any direction except those in which the signal can interfere with reception of an incumbent station 180. The system 100 includes a network site 110 and a transceiver 150. The network site 110 includes an antenna 120 and a base station 130. The system 100 can also include an external controller 160.

The antenna 120 of the network site 110 can receive, transmit, or receive and transmit electromagnetic waves 122a-122n (where n represents the total number of electromagnetic waves transmitted by the network site 110). The electromagnetic waves 122a-122n can have a frequency within a pre-determined frequency spectrum. The frequency of the electromagnetic waves 122a-122n can also be adjacent to or overlap with the desired frequency spectrum. The desired frequency spectrum can be in any appropriate frequency band, including a C band (e.g., 3.7 to 4.2 GHz), 600 megahertz (MHz) band, or the like. The antenna 120 can direct the electromagnetic waves 122a-122n in any desired direction(s) based on tilting (i.e., rotating the antenna 120 horizontally, vertically, or horizontally and vertically), beamforming (i.e., directing a beam using a phased array based on constructive and destructive interference), or the like.

The antenna 120 can be in communication with the base station 130. The base station 130 includes electronic architecture to transmit, receive, or transmit and receive electromagnetic waves via the antenna 120. The electronic architecture can include a transceiver, an encoder, a multiplexer, a combiner, the like, or combinations or multiples thereof.

In one example, the base station 130 can include a station controller 140. The station controller 140 acts as an interface between one or more components of the base station 130 and the antenna 120. The station controller 140 can be circuitry (i.e., hardware), a program (i.e., software), or both circuitry and software. The station controller 140 includes a processor 142 and memory 144. The processor 142, such as a CPU, controls and coordinates the operations of the other components of the base station 130 and the antenna 120. The memory 144 stores information associated with the base station 130 (e.g., location, signal data, or the like), the antenna 120 (e.g., direction to which antenna 120 directs electromagnetic waves 122a-122n or from which antenna receives electromagnetic waves), the electromagnetic waves 122a-122n (e.g., magnitude and frequency), received electromagnetic waves (e.g., magnitude and frequency, direction of transmitted electromagnetic waves when receiving an electromagnetic wave in response) or the like. The memory 144 can be primary memory (e.g., RAM, ROM, or the like) or secondary memory (e.g., hard drive, CD, thumb drive, or the like).

The station controller 140 can also include a direction module 146. The direction module 146 determines directions in which each of the electromagnetic waves 122a-122n are transmitted from the antenna 120. The direction module 146 can then send a direction signal to the antenna 120, which can include an instruction or a command, to cause the antenna 120 to transmit the electromagnetic waves 122a-122n in desired directions. For example, the direction module 146 determines to transmit a first electromagnetic wave in a first direction. The direction module 146 sends an instruction via a signal to the antenna 120 to cause the antenna 120 to transmit the first electromagnetic wave in the first direction. The direction module 146 then determines to transmit a second electromagnetic wave in a second direction. The direction module 146 sends an instruction via a signal to the antenna 120 to cause the antenna 120 to transmit the second electromagnetic wave in the second direction.

The station controller 140 can also include an analysis module 148. The analysis module 148 can analyze electromagnetic waves received from external sources, such as electromagnetic waves 152a-152m received from the transceiver 150 in response to the electromagnetic waves 122a-122n transmitted by the antenna network site 110. In one example, the analysis module 148 can determine the magnitudes of the received electromagnetic waves 152a-152m (i.e., strengths of the received electromagnetic waves), the frequencies of the received electromagnetic waves, the direction of the transmitted electromagnetic wave that caused the transceiver 150 to send the electromagnetic wave received by the network site 110, the like, or combinations thereof. In another example, the electromagnetic waves 152a-152m can include payload data or characteristics associated with the electromagnetic waves 122a-122n. The payload data or characteristic is a part of electromagnetic waves 152a-152m that is the actual intended message or data to be viewed, review, analyzed, or the like. The payload data or characteristics can include signal magnitude (i.e., strength), frequency, phase, direction, the like, combinations or multiples thereof.

The analysis module 148 can also determine a received electromagnetic wave meeting or exceeding one or more transmission criteria or parameters. For example, the analysis module 148 can determine a received electromagnetic wave having the largest magnitude (i.e., strongest), received electromagnetic waves having magnitudes that exceed a threshold, or the like. The analysis module 148 instructs the direction module 146, via a signal, to avoid transmitting electromagnetic waves in the direction(s) of the incumbent station 180. The directions to avoid can be stored in the memory 144. The direction(s) can be determined based on the analysis of the magnitudes of the electromagnetic waves. For example, the electromagnetic waves 122a-122n are not transmitted in a direction of the transmitted electromagnetic wave that caused the transceiver 150 to send the electromagnetic wave having the largest magnitude. As another example, the electromagnetic waves 122a-122n are not transmitted in direction(s) of the transmitted electromagnetic wave that caused the transceiver 150 to send the electromagnetic waves having magnitudes equal to or greater than a magnitude threshold.

The analysis module 148 can also determine a feature or characteristic of the transmitted electromagnetic wave (i.e., electromagnetic waves 122a-122n) associated with the payload data or characteristic included with the received electromagnetic wave (i.e., electromagnetic waves 152a-152m) that meets or exceeds one or more transmission criteria or parameters. For example, the analysis module 148 receives the payload data or characteristic associated with the transmitted electromagnetic wave (i.e., electromagnetic waves 122a-122n) integrated in or separately received from the received electromagnetic wave (i.e., electromagnetic waves 152a-152m). The analysis module 148 can then determine which transmitted electromagnetic wave has the largest magnitude (i.e., strongest), exceeds a threshold, or the like based on the received payload data or characteristic by way of comparing one or more of the characteristics of the transmitted electromagnetic waves to a threshold or data associated with another transmitted electromagnetic wave. The comparison results in identifying the direction associated with the strongest electromagnetic wave(s) of the comparison process. Based on that comparison, the analysis module 148 then instructs the direction module 146, via a signal, to avoid transmitting electromagnetic waves in the direction(s) of the incumbent station 180. The direction(s) to avoid can be stored in the memory 144. The direction(s) can be determined based on the analysis of the payload data or characteristic associated with the transmitted electromagnetic waves (i.e., electromagnetic waves 122a-122n).

The direction module 146, the analysis module 148, or both the direction module 146 and the analysis module 148 can be part of or separate from the processor 142.

In another example, the system 100 includes an external controller 160. The external controller 160 is external to the network site 110 (i.e., not located in the antenna 120 or the base station 130). The external controller 160 is similar to the station controller 140, except that the external controller 160 is located externally to the network site 110. The external controller 160 or a portion thereof can be used when the base station 130 does not include the station controller 140 or a portion thereof. The external controller 160 acts an interface between one or more external components (e.g., the input 170, an external system, or the like) and the antenna 120. The external controller 160 can be circuitry (i.e., hardware), a program (i.e., software), or both circuitry and software. The external controller 160 includes a processor 162 and memory 164. The processor 162, such as a CPU, controls and coordinates the operations of the other components of the base station 130 and the antenna 120. The memory 164 stores information associated with the base station 130 (e.g., location), the antenna 120 (e.g., direction to which antenna 120 directs electromagnetic waves 122a-122n or from which antenna receives electromagnetic waves), the electromagnetic waves 122a-122n (e.g., magnitude and frequency), received electromagnetic waves (e.g., magnitude and frequency, direction of transmitted electromagnetic waves when receiving an electromagnetic wave in response) or the like. The memory 164 can be primary memory (e.g., RAM, ROM, or the like) or secondary memory (e.g., hard drive, CD, thumb drive, or the like).

The external controller 160 can also include a direction module 166. The direction module 166 determines directions in which each of the electromagnetic waves 122a-122n are transmitted from the antenna 120. The direction module 166 can then send a direction signal to the antenna, which can include an instruction or command, to cause the antenna 120 to transmit the electromagnetic waves 122a-122n in desired directions. For example, the direction module 166 determines to transmit a first electromagnetic wave in a first direction. The direction module 166 sends an instruction via a signal to the antenna 120 to cause the antenna 120 to transmit the first electromagnetic wave in the first direction. The direction module 166 then determines whether to instruct the antenna to transmit a second electromagnetic wave in a second direction. The direction module 166 sends an instruction via a signal to the antenna 120 to cause the antenna 120 to transmit the second electromagnetic wave in the second direction.

The external controller 160 can also include an analysis module 168. The analysis module 168 can analyze electromagnetic waves received from external sources, such as electromagnetic waves 152a-152m received from the transceiver 150 that were generated or transmitted in response to the electromagnetic waves 122a-122n transmitted by the antenna network site 110. The analysis module 168 can determine the magnitudes of the received electromagnetic waves, the frequencies of the received electromagnetic waves, the direction of the transmitted electromagnetic wave that caused the transceiver 150 to send the electromagnetic wave received by the network site 110, the like, or combinations thereof. The analysis module 168 can also determine a received electromagnetic wave having the largest magnitude, received electromagnetic waves having magnitudes that exceed a threshold, or the like (i.e., a transmission criteria or parameter).

To determine whether the network site 110 has output test signals in all desired or possible directions, the controller (e.g., station controller 140 or external controller 160) compares all directions in which test signals were emitted to all directions to which test signals can be emitted. This comparison can be performed by a direction module of the controller (e.g., station controller 140 or external controller 160), by the processor (e.g., the processor 142 or the processor 162), or the like.

The analysis module 168 can instruct the direction module 166 avoid transmitting electromagnetic waves in the direction(s) of the incumbent station 180. The directions to avoid can be stored in the memory 164. The direction(s) can be determined based on the analysis of the magnitudes of the electromagnetic waves, such as by the station controller 140 or the external controller 160. For example, the electromagnetic waves 122a-122n are not transmitted in a direction of the transmitted electromagnetic wave that caused the transceiver 150 to send the electromagnetic wave having the largest magnitude. For example, the electromagnetic waves 122a-122n are not transmitted in a direction of the transmitted electromagnetic wave that caused the transceiver 150 to send the electromagnetic wave having the largest magnitude. As another example, the electromagnetic waves 122a-122n are not transmitted in direction(s) of the transmitted electromagnetic wave that caused the transceiver 150 to send the electromagnetic waves having magnitudes equal to or greater than a magnitude threshold.

The direction module 166, the analysis module 168, or both the direction module 166 and the analysis module 168 can be part of or separate from the processor 162.

The system 100 can also include an input 170. In one example, the input 170 can be a keyboard, a touch screen, or any object or device to input information into the station controller 140 or the external controller 160. The input 170 can be used to permit an operator to input a frequency, a set of frequencies, or a frequency band across which the electromagnetic waves 122a-122n are to be transmitted.

In another example, the input 170 can be a stored schedule or a schedule selected from a library of scheduled test signal transmission angles. The input 170 can be a memory or library with a stored sequence for the signal transmission angles, including those to avoid. The sequences can be a default or automatically run sequence. The sequence can include an option to be overridden by a manually entered sequence.

The input 170 can be a physical component of the base station 130. The input 170 can be external to the base station 130 and can be in communication with the base station 130 via a wired connection (e.g., USB) or a wireless connection (e.g., Bluetooth®, infrared, WiFi, or the like). The input 170 can be external to the external controller 160 and can be in communication with the external controller 160, or a device in which the external controller 160 is a component, via a wired connection (e.g., USB) or a wireless connection (e.g., Bluetooth®, infrared, WiFi, or the like).

The system 100 also includes the transceiver 150. The transceiver 150 is placed proximal to the incumbent station 180 (e.g., up to 500 meters away from the incumbent station), such as an Earth station for a satellite communication network. The transceiver 150 can be placed as close to a receiving side of the incumbent station 180 (e.g., a concave side including an antenna 182) without being in a transmission path between the incumbent station 180 and a satellite (not shown) or another satellite network component with which the incumbent station 180 communicates. Alternatively, the transceiver 150 can be placed as close to a receiving side of the incumbent station 180 (e.g., a concave side including an antenna 182) and inline with the transmission path (i.e., a point on a line directly between the antenna 182 of the incumbent station 180 and the satellite) between the incumbent station 180 and a satellite (not shown) or another satellite network component with which the incumbent station 180 communicates. For example, the transceiver 150 can be in the transmission path when the incumbent station operator permits it or when the incumbent station 180 is temporarily turned off, not active, or operating in a frequency different than the frequency(ies) of the electromagnetic waves 122a-122n, the electromagnetic waves 152a-152m, or both.

The incumbent station 180 is an already-existing station that can receive or receive and transmit signals having a frequency within the frequency spectrum across which the network site 110 transmits the electromagnetic waves 122a-122n. For example, the transceiver 150 can be placed on the ground, on an external surface or structure of the incumbent station 180 (e.g., convex side or outer edge of a satellite dish, a wall, or the like), on a surface or structure not in direct physical contact with the incumbent station 180 (e.g., a wall, a fence, a tree, a rock, or the like), or the like.

The transceiver 150, which can include a processor and memory, is configured to receive the electromagnetic waves 122a-122n and transmit electromagnetic waves 152a-152m (where m represents the total number of electromagnetic waves transmitted by the transceiver 150). The electromagnetic waves 152a-152m are transmitted when one or more of the electromagnetic waves 122a-122n are received by the transceiver 150. The electromagnetic waves 152a-152m have a frequency within the frequency spectrum across which the network site 110 transmits the electromagnetic waves 122a-122n. In one example, the transceiver 150 transmits the electromagnetic waves 152a-152m towards the network site 110 in a set direction (i.e., all electromagnetic waves 152a-152m are transmitted in the same direction). In another example, the transceiver 150 transmits the electromagnetic waves 152a-152m towards the network site 110 in multiple directions similar to the tilting or beamforming of the antenna 120 (i.e., electromagnetic waves 152a-152m are transmitted in different directions based on the directions from which the electromagnetic waves 122a-122n are received). In yet another example, the transceiver 150 transmits the electromagnetic waves 152a-152m in all directions (i.e., omnidirectional), such as via an omnidirectional antenna.

Figure 2:
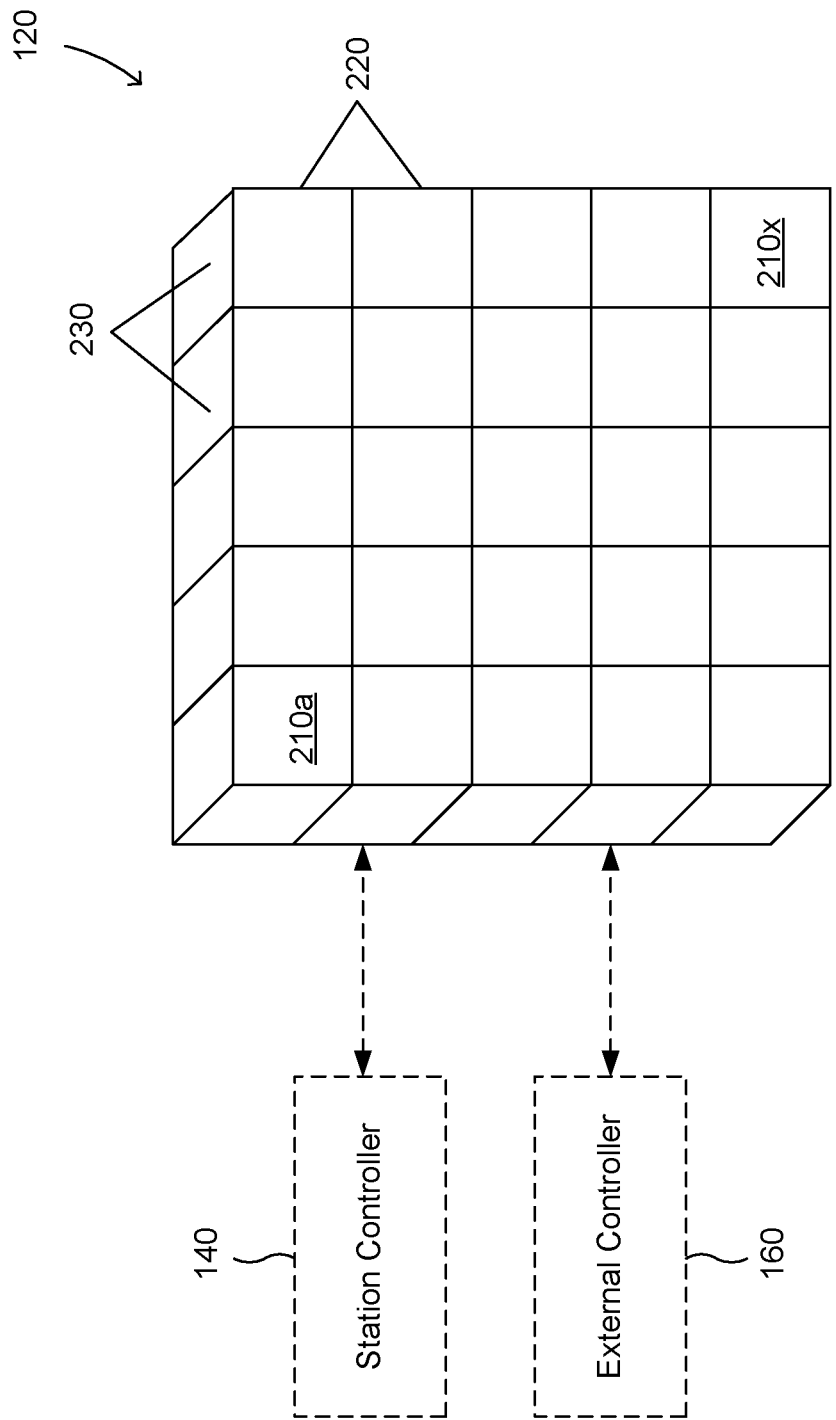
FIG. 2 illustrates an example antenna.

FIG. 2 shows a phased array antenna 200 for beamforming. Beamforming is a process by which a beam is transmitted in a desired direction based on constructive and destructive interferences of individual electromagnetic waves emitted by antenna elements 210a-210x (where x is the total number of antenna elements within an array based on a number of rows 220 and a number of columns 230). The antenna elements 210a-210x can be transmitters. The antenna elements 210a-210x can also include receivers, such that the antenna elements 210a-210x are transceivers.

Each of the antenna elements 210a-210x can emit their own electromagnetic waves. The emitted electromagnetic waves can have different magnitudes (i.e., different strengths). The emitted electromagnetic waves can also be in different phases. Phase difference is the difference in degrees or radians when two or more waveforms reach their maximum or zero values. Waveforms are "in phase" when their maximum or zero values occur at the same time. For example, two Sine waves having different magnitudes can be in-phase. Waveforms are "out of phase" when their maximum or zero values occur at different times. For example, Sine and Cosine waves, whether having the same or different magnitudes, have different phases or are out of phase.

Constructive and destructive interferences of the individual electromagnetic waves can form a total wave having a total magnitude and a total frequency. Constructive interference is the interference of two or more waves of equal frequency and phase, which results in mutual reinforcement and the production of a single magnitude equal to the sum of the magnitudes of the individual waves. Destructive interference is the interference of two or more waves of equal frequency and opposite phase (e.g., 180° out of phase), which results in the cancellation of the individual waves. The total wave can be directed in a desired direction based on the constructive and destructive interferences. The antenna elements 210a-210x, including their respective electromagnetic waves, can be controlled by the station controller 140 or the external controller 160.

The phased array antenna 200 can include any number of antenna elements 210a-210x based on the number of rows 220 and columns 230 which form an array of r×c, where r is the number of rows and c is the number of columns. R and c can be both equal to or greater than 1. R and c can be equal or different. For example, the array can be 1×8, 2×4, 4×4, 64×64, or the like. The number of antenna elements 210a-210x can be selected based on the number of discrete directions in which to emit a signal or the like. For example, a 64×64 array can provide more discrete directions than a 4×4 because more emitted signals can have more constructive and destructive interferences.

Figure 3:
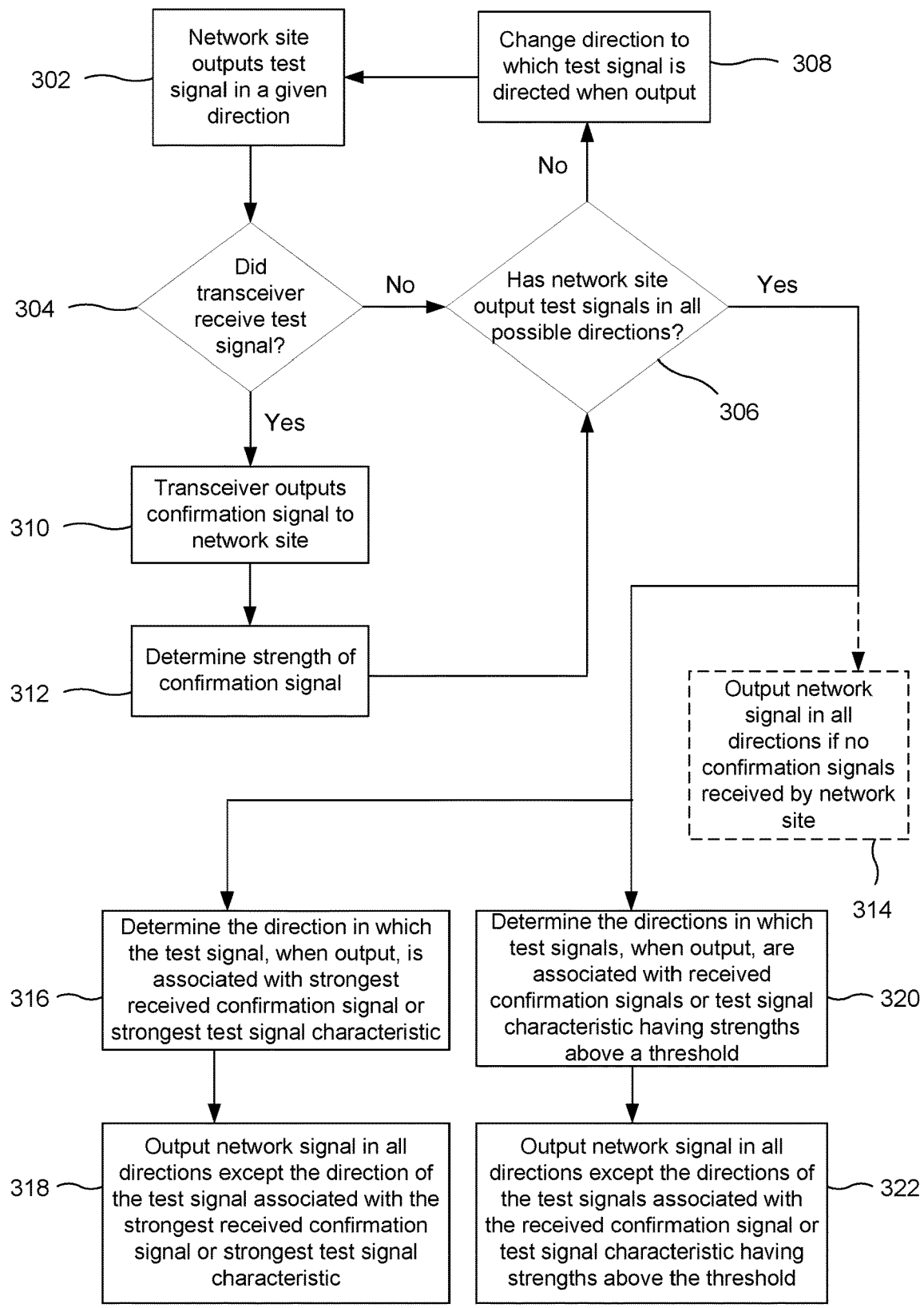
FIG. 3 illustrates flowchart of an example process for avoiding signal interference.

FIG. 3 shows a flowchart of a method to avoid interfering with signal reception of an incumbent station. At 302, a network site outputs a test signal in a given direction. The test signal can be output in the given direction by tilting (i.e., rotating) an antenna of the network site, by performing beamforming with the antenna of the network site, or the like.

In one example, a controller of a base station or an external controller can instruct motors attached to the antenna to tilt or rotate the antenna to emit the test signal in the given direction. The antenna can be rotated around a horizontal axis (e.g., x-axis) to move the antenna in a direction perpendicular to a horizon. The antenna can be rotated around a vertical axis (e.g., z-axis) to move the antenna in a direction parallel to the horizon. The antenna can be rotated simultaneously around the horizontal and vertical axes. In another example, the controller of a base station or the external controller can instruct individual antenna elements to emit individual electromagnetic waves, which form the test signal emitted in the given direction based on constructive and destructive interferences (i.e., beamforming).

At 304, the network site determines whether a transceiver located proximal to an incumbent station receives the test signal from the network site. To determine if the transceiver received the test signal, the network site can listen for a confirmation signal from the transceiver from the direction in which the test signal was transmitted. Listening is a state in which the network site waits for a transmission. The confirmation signal is an electromagnetic wave transmitted by the transceiver in response to the transceiver receiving the test signal. If no confirmation signal is received by the network site within a pre-determined amount of time (e.g., up to 1 minute) after outputting the test signal, then the network site determines that the transceiver did not receive the test signal. If the confirmation signal is received by the network site, then network site determines that the transceiver received the test signal from the network site.

If the transceiver does not receive the test signal, then, at 306, the network site determines whether the network site has output test signals in all desired or possible directions. To determine whether the network site has output test signals in all desired or possible directions, a controller (e.g., station controller or external controller) compares all directions in which test signals were emitted to all directions to which test signals can be emitted. This comparison can be performed by a direction module of the controller, by a processor and memory, or the like.

If the network site has not output test signals in all directions, then, at 308, the direction in which the network site emits the test signal is changed. The direction can be changed by tilting, beamforming, or the like.

If the network site has output test signals in all direction, then the network determines the directions in which to emit network signals and direction in which to avoid emitting network signals. Network signals are electromagnetic waves emitted by the network site to cellular-connected user equipment (e.g., mobile phones, smartphones, smart watches, computers, personal digital assistants, or the like) to provide available services (e.g., voice, test, or video) to the user equipment.

In one example, at 314, network signals can be output in all directions by the network site when no confirmation signals are received. Since no confirmation signals are received, the network site can determine that there are no incumbent stations that can be interfered by network signals. This does not inherently mean that there are no incumbent stations proximal to the network site. This can further mean that no incumbent sites are interfered with by the proximal network site. For example, external structures (e.g., trees, buildings, hills, mountains, etc.) can interfere with signal transmission. These external structures can inhibit the test signal or network signal from even reaching the incumbent site.

In another example, at 316, the network site, such as via the station controller or the external controller, can determine the directions in which to emit the network signals and the direction in which to not emit the network signals.

In one example, the direction in which network signals are not emitted is associated with the direction in which the test signal was emitted when receiving the strongest confirmation signal from the transceiver. When the transceiver receives the test signal, the transceiver outputs the confirmation signal. The confirmation signal can be transmitted back in the direction from which test signal was received. The transceiver can determine the direction based on a sensor array of an antenna. The direction can be determined based on which individual sensor group of sensors is tripped when receiving the test signal. This can account for signal reflection rather direct signal transmission. Signals can be reflected off various structures towards the incumbent station even though the signals were not initially directed towards the incumbent station. Therefore, reflected signals can still cause interference even if not initially directed directly to the incumbent station.

Alternatively, the transceiver can transmit the confirmation signal back via a direct transmission path or an omni-directional path.

The network site can determine the strongest confirmation signal based on the magnitudes of the received confirmation signals. The direction of the test signal causing that confirmation signal is then associated with that confirmation signal.

In another example, the direction in which network signals are not emitted is associated with the direction(s) in which the test signal was emitted when receiving payload data or characteristic associated with the strongest test signal from the antenna. When the transceiver receives the test signal, the transceiver, such as via a processor, analyzes a characteristic of the received test signal. The processor then includes a payload with the confirmation signal. The payload includes data or characteristics associated with the received test signal. The transceiver then outputs the confirmation signal including the payload data or characteristic. The confirmation signal can be transmitted back in the direction from which the test signal was received. The transceiver can determine the direction based on a sensor array of an antenna. The direction can be determined based on which individual sensor or group of sensors is tripped when receiving the test signal. This can account for signal reflection rather direct signal transmission. Signals can be reflected off various structures towards the incumbent station even though the signals were not initially directed towards the incumbent station. Therefore, reflected signals can still cause interference even if not initially directed directly to the incumbent station.

Alternatively, the transceiver can transmit the confirmation signal back via a direct transmission path or an omni-directional path.

The network site can determine the strongest test signal based on the associated payload data or characteristic. The direction of the test signal is then associated with that test signal.

At 318, the network site outputs network signals in all directions except for the direction of the test signal associated with the strongest confirmation or test signal. The controller of the network site can then instruct the antenna to not emit network signals in that direction.

In yet another example, at 320, the network site, such as via the station controller or the external controller, can determine the directions in which to emit the network signals and the direction in which to not emit the network signals. In one example, the direction in which network signals are not emitted is associated with the direction in which the test signal was emitted when receiving confirmation signals from the transceiver meeting or exceeding one or more transmission criteria or parameters, including, for example, strengths (e.g., signal magnitudes) at or above a threshold. When the transceiver receives the test signal, the transceiver outputs the confirmation signal. The confirmation signal can be transmitted back in the direction from which the test signal was received. The transceiver can determine the direction based on a sensor array of an antenna. The direction can be determined based on which individual sensor group of sensors is tripped when receiving the test signal. This can account for signal reflection rather direct signal transmission. Signals can be reflected off various structures towards the incumbent station even though the signals were not initially directed towards the incumbent station. Therefore, reflected signals can still cause interference even if not initially directed directly to the incumbent station.

Alternatively, the transceiver can transmit the confirmation signal back via a direct transmission path or an omni-directional path.

The network site can determine the strengths of the confirmation signals based on the magnitudes of the received confirmation signals. The directions of the test signals causing those respective confirmation signals are then associated with the respective confirmation signals.

In another example, the direction in which network signals are not emitted is associated with the direction in which the test signal associated with payload data or characteristics of the received confirmation signals meets or exceeds one or more transmission criteria or parameters, including, for example, signal strengths (e.g., signal magnitudes) at or above a threshold. When the transceiver receives the test signal, the transceiver, such as via a processor, analyzes a characteristic of the received test signal. The processor then includes a payload with the confirmation signal. The payload includes data or characteristics associated with the received test signal. The transceiver then outputs the confirmation signal including the payload data or characteristic. The confirmation signal can be transmitted back in the direction from which the test signal was received. The transceiver can determine the direction based on a sensor array of an antenna. The direction can be determined based on which individual sensor or group of sensors is tripped when receiving the test signal. This can account for signal reflection rather direct signal transmission. Signals can be reflected off various structures towards the incumbent station even though the signals were not initially directed towards the incumbent station. Therefore, reflected signals can still cause interference even if not initially directed directly to the incumbent station.

Alternatively, the transceiver can transmit the confirmation signal back via a direct transmission path or an omnidirectional path.

The network site can determine the strengths of the test signals based on the payload data or characteristic included with the received confirmation signals. The directions of the test signals are then associated with the respective test signals.

At 322, the network site outputs network signals in all directions except for the directions of the test signals associated with the confirmation or test signals having strengths at or above a certain threshold. The controller of the network site can then instruct the antenna to not emit network signals in those directions. The threshold can be determined based on a signal strength that can cause reception interference at the incumbent station. Any signal having a strength below the threshold does not cause interference. And signal having a strength at or above the threshold does cause interference. Therefore, emitting signals in directions which can result in signals at the incumbent station having strengths at or above the threshold, which can cause reception interference, can be prevented.

If the transceiver does receive the test signal, then, at 310, the transceiver outputs a confirmation to the network site. At 312, the network site determines the strength of the confirmation signal.

Then, at 306, it is determined whether the network site has output test signals in all possible directions, as discussed above.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for avoiding signal interference at an incumbent station, the system comprising:
    an antenna configured to output a test signal in a particular direction and to receive a confirmation signal;
    a transceiver positioned near or on the incumbent station, the transceiver configured to:
        receive the test signal from the antenna, and
        output the confirmation signal in response to receiving the test signal;
    a controller in communication with the antenna, the controller configured to:
        transmit instructions to the antenna to output the test signal,
        determine a strength of the confirmation signal received by the antenna,
        determine whether the strength of the confirmation signal meets a transmission criterion or parameter, and
        when the determination that the strength of the confirmation signal meets the transmission criterion or parameter:
            identify or receive data that includes the particular direction of the test signal, and
            cause the antenna to output network signals so as to avoid the particular direction of the test signal such that the output network signals avoid the incumbent station in response to the confirmation signal meeting the transmission criterion or parameter.

2. The system of claim 1, wherein the controller is further configured to output a direction signal to the antenna, the direction signal including an instruction to change a direction in which the test signal is output by the antenna.

3. The system of claim 2, wherein the direction signal causes the antenna to tilt in a direction different than the particular.

4. The system of claim 2, wherein the direction signal causes antenna elements of the antenna to output electromagnetic waves that, the test signal being output in a given direction that is based on constructive interference, destructive interference, or constructive and destructive interferences.

5. The system of claim 1, wherein the transceiver is further configured to output the confirmation signal in the particular direction from which the test signal was received.

6. The system of claim 5, wherein the transceiver includes a sensor configured to detect the particular direction from which the test signal was received based on a characteristic of the test signal.

7. The system of claim 1, wherein the transceiver is physically positioned outside of a transmission path between the incumbent station and a satellite in communication with the incumbent station.

8. The system of claim 1, wherein the transceiver is further configured to output the confirmation signal in all directions.

9. The system of claim 1, wherein the transmission criterion or parameter is a threshold, the threshold being associated with a strength at or above which the network signal interferes with reception of the incumbent station.

10. The system of claim 1, wherein the transceiver is physically positioned inline with a transmission path between the incumbent station and a satellite in communication with the incumbent station.

11. The system of claim 1, wherein the transceiver is further configured to receive a plurality of test signals and output a plurality of respective confirmation signals, and wherein the antenna is further configured to receive the plurality of confirmation signals and the controller is further configured to determine the strengths of the plurality of respective confirmation signals.

12. The system of claim 11, wherein the transceiver is further configured to:
    determine a direction from which the strongest test signal among the plurality of test signals is received, and
    output a strongest confirmation signal among the plurality of respective confirmation signals, the strongest confirmation signal corresponding to the strongest test signal.

13. The system of claim 12, wherein the controller is further configured to cause the antenna to output the network signals in directions that do not correspond to the strongest confirmation signal.

14. A system for avoiding signal interference at an incumbent station, the system comprising:

an antenna configured to:
  output a plurality of test signals, and receive a plurality of confirmation signals;
a transceiver positioned near or on the incumbent station, the transceiver configured to:
  receive the plurality of test signals from the antenna,
  generate the plurality of confirmation signals based respectively on the plurality of test signals, wherein strengths of the plurality of confirmation signals are based respectively on strengths of the plurality of test signals received at the transceiver, and
  output the plurality of confirmation signals;
a controller in communication with the antenna, the controller configured to:
  determine respective strengths of the plurality of confirmation signals received at the antenna,
  determine a direction of a test signal among the plurality of test signals that corresponds to the strongest confirmation signal among the plurality of confirmation signals, and
  cause the antenna to output network signals in directions that do not correspond to the strongest confirmation signal.

15. The system of claim 14, wherein the controller is further configured to determine the strongest confirmation signal among the plurality of confirmation signals by comparing a common characteristic among the plurality of confirmation signals.

* * * * *